United States Patent
Schurna et al.

(10) Patent No.: US 8,955,632 B2
(45) Date of Patent: Feb. 17, 2015

(54) TUBULAR FRAME STRUCTURE FOR A THREE-WHEELED MOTOR VEHICLE

(75) Inventors: Thorsten Schurna, Wiesbaden (DE); Curd-Sigmund Boettcher, Eltville (DE)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 13/600,436

(22) Filed: Aug. 31, 2012

(65) Prior Publication Data

US 2013/0056293 A1 Mar. 7, 2013

(30) Foreign Application Priority Data

Sep. 3, 2011 (DE) .......................... 10 2011 112 386

(51) Int. Cl.
*B60K 1/04* (2006.01)
*B62D 61/06* (2006.01)
*B62D 31/00* (2006.01)
*B62D 23/00* (2006.01)

(52) U.S. Cl.
CPC ............ *B62D 31/003* (2013.01); *B62D 61/065* (2013.01); *B60K 1/04* (2013.01); *B62D 23/005* (2013.01); *Y10S 180/908* (2013.01)
USPC ........... 180/210; 280/788; 280/784; 280/781; 180/311; 180/68.5; 180/908

(58) Field of Classification Search
CPC ........ B62D 21/02; B62D 21/11; B62D 21/12; B62D 21/15; B62D 21/183; B62D 23/005; B62D 31/003; B62D 61/06; B62D 61/065; B62K 5/02; B62K 5/027; B62K 5/05; B62K 5/06; B62K 7/02; B62K 7/04; B60K 1/04
USPC ................. 280/781, 784, 785, 788, 796, 798; 180/210, 211, 214–216, 65.1, 68.5, 180/908; 296/205
See application file for complete search history.

(56) References Cited

U.S. PATENT DOCUMENTS

| 3,022,846 | A | * | 2/1962 | Thompson ....................... 180/11 |
| 3,554,311 | A | * | 1/1971 | Thompson et al. ........... 180/220 |
| 4,045,075 | A | * | 8/1977 | Pulver ............................ 296/205 |
| 4,049,309 | A | * | 9/1977 | Seal ............................ 296/181.5 |
| 4,158,397 | A | * | 6/1979 | Reynolds ....................... 180/210 |
| 4,217,970 | A | * | 8/1980 | Chika ............................ 180/298 |
| 4,660,345 | A |   | 4/1987 | Browning |
| 4,735,275 | A | * | 4/1988 | Tsukahara et al. ............. 180/215 |
| 4,799,708 | A | * | 1/1989 | Handa et al. ................... 280/796 |
| 4,817,985 | A | * | 4/1989 | Enokimoto et al. ........... 280/788 |

(Continued)

FOREIGN PATENT DOCUMENTS

| CN | 202175099 U | 3/2012 |
| FR | 2559119 A1 * | 8/1985 |

(Continued)

*Primary Examiner* — Ruth Ilan
(74) *Attorney, Agent, or Firm* — Ingrassia Fisher & Lorenz, P.C.

(57) ABSTRACT

A tubular frame structure is provided for a three-wheeled motor vehicle with an top upper frame extending in the vehicle longitudinal and vehicle transverse direction, and with a lower frame extending in vehicle longitudinal direction and vehicle transverse direction, which is structurally connected with the upper frame via several connecting tubes extending substantially in the vehicle vertical direction, to form at least one energy absorption structure.

7 Claims, 5 Drawing Sheets

(56) References Cited

U.S. PATENT DOCUMENTS

| | | | |
|---|---|---|---|
| 5,236,060 A | 8/1993 | Huber | |
| 5,401,056 A * | 3/1995 | Eastman | 280/785 |
| 5,975,624 A * | 11/1999 | Rasidescu et al. | 296/203.01 |
| 6,267,388 B1 * | 7/2001 | Atkinson | 280/6.157 |
| 6,732,830 B2 * | 5/2004 | Gagnon et al. | 180/291 |
| 6,926,350 B2 | 8/2005 | Gabbianelli et al. | |
| 7,648,170 B2 * | 1/2010 | Geslin et al. | 280/785 |
| 8,196,686 B2 * | 6/2012 | Grieve | 180/65.235 |
| 2002/0112907 A1 * | 8/2002 | Maeda et al. | 180/69.4 |
| 2002/0149235 A1 * | 10/2002 | Alderson | 296/205 |
| 2005/0173180 A1 * | 8/2005 | Hypes et al. | 180/292 |
| 2007/0000715 A1 * | 1/2007 | Denney | 180/311 |
| 2008/0223637 A1 * | 9/2008 | Bartilson | 180/65.4 |
| 2009/0000841 A1 * | 1/2009 | Reed et al. | 180/68.5 |
| 2009/0014993 A1 * | 1/2009 | Tope | 280/781 |
| 2010/0194088 A1 * | 8/2010 | Davis et al. | 280/783 |
| 2011/0024221 A1 * | 2/2011 | Murray | 180/312 |
| 2011/0036655 A1 * | 2/2011 | Ackley | 180/215 |
| 2012/0037441 A1 * | 2/2012 | Frohnmayer et al. | 180/210 |

FOREIGN PATENT DOCUMENTS

| | | |
|---|---|---|
| GB | 151577 A | 1/1921 |
| JP | 3-109130 A * | 5/1991 |

* cited by examiner

TUBULAR FRAME STRUCTURE FOR A THREE-WHEELED MOTOR VEHICLE

CROSS-REFERENCE TO RELATED APPLICATION

This application claims priority to German Patent Application No. 10 2011 112 386.9, filed Sep. 3, 2011, which is incorporated herein by reference in its entirety.

TECHNICAL FIELD

The technical field relates to a tubular frame structure for a three-wheeled motor vehicle, and a corresponding motor vehicle which has in particular an electric drive.

BACKGROUND

Compact and subcompact vehicles offer a possible platform for the practical implementation of purely electric drive concepts. The comparatively small capacity and frequent charging cycles connected therewith and the comparatively great weight of batteries for the electric drive which are to be carried in the vehicle require a drastic reduction in the weight of the vehicle, in order to achieve a respectable saving of energy and hence an acceptable range for the customer in purely electrically operated vehicles.

Thus, for example, from U.S. Pat. No. 5,116,069 a three-wheeled vehicle is known, having a front wheel, two rear wheels, with a safety frame and an aerodynamic body design with sliding doors. The safety frame comprises here three crossed roll bars, which are fastened to a complete wrap-around bumper by means of three longitudinally arranged tubes. The said roll bars and the associated tubes, which form a roll cage, are fastened at a total of nine points along the bumper. However, such a roll cage does not appear to meet present-day safety requirements.

It is therefore at least one object to provide an improved supporting structure with regard to its crash- and energy absorption behavior for a three-wheeled vehicle, which is optimized in particular with regard to its deformation- and intrusion behavior for the absorption and dissipation of externally acting forces. In addition, other objects, desirable features and characteristics will become apparent from the subsequent summary and detailed description, and the appended claims, taken in conjunction with the accompanying drawings and this background.

SUMMARY

A tubular frame structure is configured for motor vehicles, in particular for a three-wheeled motor vehicle. It has a top upper frame, extending in a plane formed by vehicle longitudinal direction (x) and vehicle transverse direction (y), and a lower frame likewise extending substantially in vehicle longitudinal direction (x) and vehicle transverse direction (y). The lower frame and upper frame are structurally connected with one another here by means of several connecting tubes, extending substantially in the vehicle vertical direction (z), for the formation at least of one energy absorption structure.

The upper frame and lower frame form a comparatively rigid cage here, which has over its entire structural height on the one hand a comparatively stable supporting structure and on the other hand an energy absorption behavior, optimized for frontal and lateral impact, and a corresponding deformation behavior protecting the vehicle occupant. The lower frame forms here, as it were, a base-side doubling of the upper frame constructed as the main frame. In an embodiment, the two frames are largely closed, when viewed in circumferential direction, and are constructed free of interruption. Entry into the passenger compartment of the motor vehicle preferably takes place above the upper frame. The latter is consequently not interrupted by a movably arranged door structure.

According to an embodiment, provision is made that the upper frame and the lower frame are aligned substantially parallel to one another and are arranged spaced apart from one another with respect to the vehicle vertical direction (z). The upper frame and lower frame can come to lie here substantially overlapping one another. This means that the basic geometry of the upper frame and lower frame is at least substantially congruent in both parts. The cage formed by the two frames and the connecting tubes has in this respect a substantially cubic structure that is particularly well suited to the absorption of externally introduced mechanical forces.

Provision is made, furthermore, that the upper frame and/or the lower frame have two longitudinal tubes which are laterally arranged and run substantially in the vehicle longitudinal direction (x). These longitudinal tubes, undertaking the function of a longitudinal beam, are connected with one another structurally at the front, at their end section pointing in the direction of travel, via corresponding transverse tubes to form a respectively circumferential upper- and/or lower frame.

In an embodiment, provision is further made that longitudinal tubes, spaced apart from one another laterally, of upper- and/or lower frame are aligned substantially parallel to one another in a front end section and/or in a rear end section. The distance from the front and rear end section of the longitudinal tubes is different here, however, viewed in the vehicle transverse direction (y).

Provision is made in particular that the longitudinal tubes of upper and/or lower frame have a smaller spacing in the front region than in the rear section. The narrowing of the upper and/or lower frame, provided forward towards the front of the vehicle, serves in particular for the space-saving arrangement of wheel suspensions which are to be arranged outside the tubular frame structure. Thus, for the three-wheeled vehicle, one axle having two wheels is provided at the front and one axle having a single wheel is provided in the rear region. By the tubular frame structure, pointing in the direction of travel, being constructed narrower toward the front than at the rear or in the region of the passenger compartment, the front wheel suspensions and the associated wheels can be bypassed in a controlled manner on the outer side of the tubular frame structure for instance in the case of a frontal impact. A penetration into the interior of the tubular frame structure and into the passenger compartment that is formed from can therefore be largely prevented.

According to an embodiment, the front and the rear section of the at least one longitudinal tube of upper- and/or lower frame are connected with one another via an intermediate section extending obliquely outwards contrary to the direction of travel. The intermediate section is preferably constructed here substantially in a straight line and is connected at two kinks or bending points with the front and rear end sections of the longitudinal tube. The kinks or bending points can be provided here with separate reinforcing elements.

The longitudinal tube extending from the front end section to the rear end section can be constructed here in particular in one piece and can have a corresponding bend in the region of the intermediate section. Alternatively, several tube sections, constructed substantially in a straight line, can be connected with one another, for instance welded with one another, to form the longitudinal tube. Separate reinforcing elements can be provided in the region of the connecting points.

According to an embodiment, provision is made in addition that longitudinal tubes associated respectively with an upper and/or lower frame are structurally connected with one another in the region of their front end section with at least one transverse tube. Provision is made here in particular that the two frames are also connected with one another in this front end section with connecting tubes running substantially in the vehicle vertical direction (z). Hereby, a largely flat front structure of the tubular frame structure can be formed, which provides in the vehicle vertical direction (z) and in the vehicle transverse direction (y) a closed frame, constructed so as to be for instance rectangular or even square, closed in itself, which is optimized in particular to receive impact energies in the case of a front impact.

According to a further embodiment, the longitudinal tubes of the upper frame are connected with one another in the region of the intermediate section, running between the front and rear end section, via a traverse member extending substantially in the vehicle transverse direction (y). The traverse member is intended to stabilize the upper frame in the region of the intermediate sections of the longitudinal tubes which run apart from one another and point away from one another. It has the function in particular of counteracting a lateral bending up or breaking away of the upper frame for instance in the case of a frontal impact. Otherwise, in the case of loading, owing to the outwardly projecting or respectively diverging alignment of the intermediate section of the longitudinal tubes of the upper frame, there would be a threat of a far-reaching spreading apart of the upper frame structure.

In an embodiment, the longitudinal tubes of the lower frame are connected with one another in the region of the front and/or rear section via several transverse tubes. Hereby, a comparatively stable base structure can be formed, which provides a comparatively high resistance to deformation in the case of a lateral impact. Furthermore, provision can be made that the upper frame and the lower frame are connected with one another at least in the region of the rear end section via a strut running in the vehicle vertical direction (z) and in the vehicle longitudinal direction (x). Such a strutting serves for a further stabilizing of the cage structure formed by upper and lower frames. The strut can also be used for the direct transmission of force into the tubular frame structure, for instance in the case of a lateral impact.

According to a further embodiment, respectively in extension of connecting tubes connecting the rear end sections of the upper and lower frame with one another, a roll bar is provided extending in the vehicle vertical direction (z) and in the vehicle transverse direction (y), which can provide at the same time a fastening structure for instance for a backrest for the vehicle occupant. For the electromotive drive, in particular comparatively high-performance batteries are to be carried on the vehicle. Provision is made here that the upper and the lower frame are connected with one another in the region of the outwardly running intermediate section and/or in the region of the rear end section of the longitudinal tubes via at least one outwardly projecting battery holding structure.

The battery holding structure can have one or more tube sections, projecting outwards for instance in a C-shape or U-shape, which enable the receiving of accordingly geometrically constructed batteries. Provision is made here in particular that the batteries that are to be carried on the vehicle are arranged outside the tubular frame structure, in particular outside the longitudinal tubes. The arrangement and configuration of the batteries and of the battery holding structure is selected here such that even in the case of a frontal or lateral impact, a penetration of the batteries into the interior of the passenger compartment can be largely prevented.

According to a further embodiment, the battery holding structure, viewed in the direction of travel, is situated behind a front axle having two wheels, in addition outside the longitudinal tubes, so that in the case of a frontal impact for instance the batteries are displaced if necessary towards the rear, but not into the interior region of the tubular frame structure.

According to a further embodiment, the upper frame is constructed as a so-called main frame which, viewed in the vehicle vertical direction (z), preferably lies at the usual height of a bumper structure. The vertical level of the upper frame is selected such that the latter lies in the region of a bumper structure in the case of collisions with other vehicles, in order to be able to receive externally introduced impact energies and forces in as extensive a manner as possible. In an accompanying aspect, in addition a three-wheeled motor vehicle is provided with a previously described tubular frame structure. The motor vehicle preferably has here a front axle having two wheels and a one-wheeled rear axle.

In addition, according to a further embodiment, provision is made that the three-wheeled motor vehicle has an electric drive and at least one energy storage unit fastened to the upper frame of the tubular frame structure, such as for example a vehicle battery or at least an accumulator.

BRIEF DESCRIPTION OF THE DRAWINGS

The detailed description will hereinafter be presented in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

The tubular frame structure 10, illustrated in various perspectives in FIG. 1 to FIG. 6, has an upper frame 12 and a lower frame 14 which, viewed in a projection from above, are constructed so as to be extensively congruent. The upper frame 12 has two lateral longitudinal tubes 18 and the lower frame 14 has two lateral longitudinal tubes 20 arranged offset to one another in the vehicle direction (z).

The longitudinal tubes 18, 20 of upper frame 12 and lower frame 14 are connected with one another respectively lying in the plane of the frame with a front transverse tube 44. The longitudinal tubes 18, 20 of upper frame and lower frame 12, 14 are connected with one another in addition in the front region via two connecting tubes 16 spaced apart from one another in the vehicle longitudinal direction (x), which extend substantially in the vehicle vertical direction (z).

The lateral longitudinal tubes 20 of the lower frame 14 are connected with one another via several transverse tubes 44, 34, 36, 38, the upper frame 12 has only a front transverse tube 44 and a rear transverse connection 24, wherein the rear transverse connection 24 is arranged elevated with respect to the plane of the upper frame 12 and extends between a bracket 26 arranged as an extension of approximately vertically aligned connecting tubes 22.

The rear-side connecting tubes 22 between upper frame 12 and lower frame 14 run slightly obliquely upward, this being in particular in order to be able to introduce corresponding impact energies, e.g., in the case of a frontal impact, into the transverse connection 24 arranged above the upper frame 12, and/or into a bracket structure 28 adjoining in the vehicle longitudinal direction. Whereas the roll bar 26 extends in a plane formed substantially by the vehicle vertical axis (z) and the vehicle transverse axis (y), the upper frame and lower frame 12, 14 run largely in a horizontally aligned plane formed substantially by the vehicle transverse direction (y) and the vehicle longitudinal direction (x).

On the rear side, a further bracket 28 is provided, which rests on the connecting tube 22 and on the roll bar 26 via struts 30, 32 running obliquely upward and obliquely downward and forward. The longitudinal tubes 18, 20 of upper frame 12 and lower frame 14 run in sections substantially in a straight line. Viewed in the vehicle longitudinal direction (x), the longitudinal tubes 18, 20 can be divided at least notionally into three sections, namely a front section 18', 20', an intermediate section 18", 20" and into a rear section 18'", 20'". The front and rear tube sections 18', 18'" and 20', 20'" run here approximately parallel to one another. The front and rear sections 18', 18'", 20', 20'" are, however, arranged offset to one another when viewed in the vehicle transverse direction (y). The longitudinal tubes 18, 20 have a greater spacing in the region of their rear section 18'", 20'" than in the front section 18', 20'.

Between the front and rear section 18', 18'", 20', 20'" an intermediate section 18", 20" is provided, extending obliquely outwards contrary to the direction of travel, which intermediate section, depending on the configuration of the longitudinal tubes 18, 20 connects the front and rear sections 18', 18'", 20', 20'" with one another either in one piece or in several pieces. This means that the entire longitudinal tube 18, 20 can either be brought by one or more bending deformation operations into the shape shown in FIG. 1 to 6, or else it can be composed of several individual parts which are securely connected with one another, in particular are welded to one another.

In the region of the kinks, in particular in the transition from central section 18", 20" to rear end section 18'", 20'", individual reinforcing elements 70 are provided, by means of which a kink region or a kink of upper and/or lower frame 12, 14 is structurally reinforcable. The intermediate sections 18" of the longitudinal tubes 18 of the upper frame 12 are structurally connected with one another in addition via a traverse member 50. The traverse member 50 is intended to prevent an outwardly directed breaking away or widening of the tubular frame structure 10, in particular of the upper frame 12 in the case of a frontal impact, or to counteract such a widening of the structure. In this respect, the connection points of the traverse member 50 form in the intermediate sections 18" a type of rotation point for a deformation of the upper longitudinal tubes 18 due, for instance, to a collision.

The upper frame 12 and the lower frame 14 are connected with one another in addition in the region of the rear sections 18'", 20'" of the longitudinal tubes 18, 20 via struts 46 running obliquely in the vehicle longitudinal direction (x) and in the vehicle vertical direction (z). The lower frame 14 has in addition in the region of a front and rear edge section of the rear end section 20'" of the longitudinal tubes 20 respectively a transverse tube 36, 38, wherein the front transverse tube 36, coming to lie approximately adjoining the intermediate section 20", is connected via two struts 40, 42, projecting outwards contrary to the direction of travel, with the rear node region formed by the transverse tube 38 and longitudinal tube section 20'".

Figure 1:
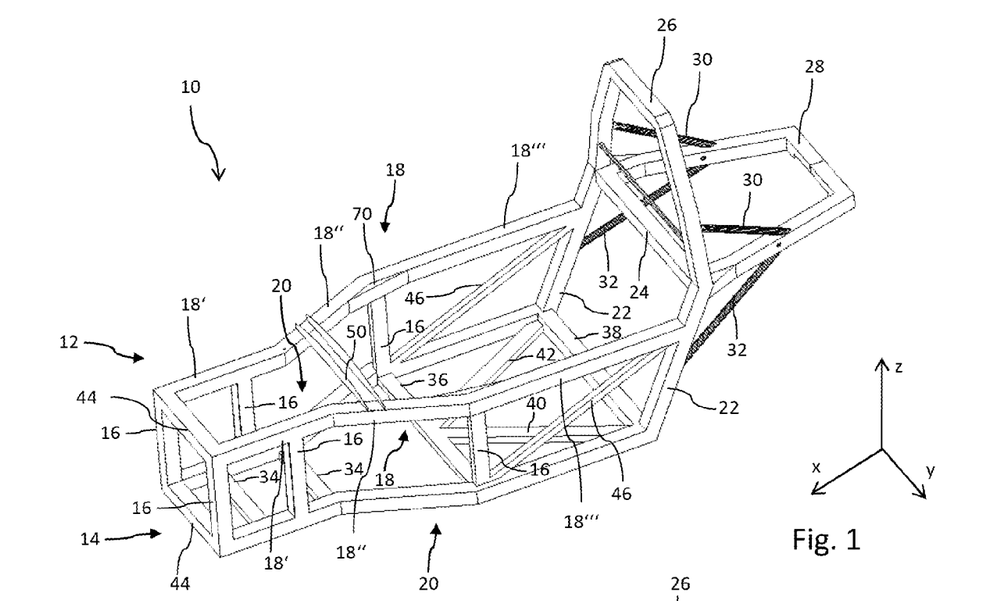
FIG. 1 is a perspective illustration of a tubular frame structure viewed from obliquely above.
Figure 2:
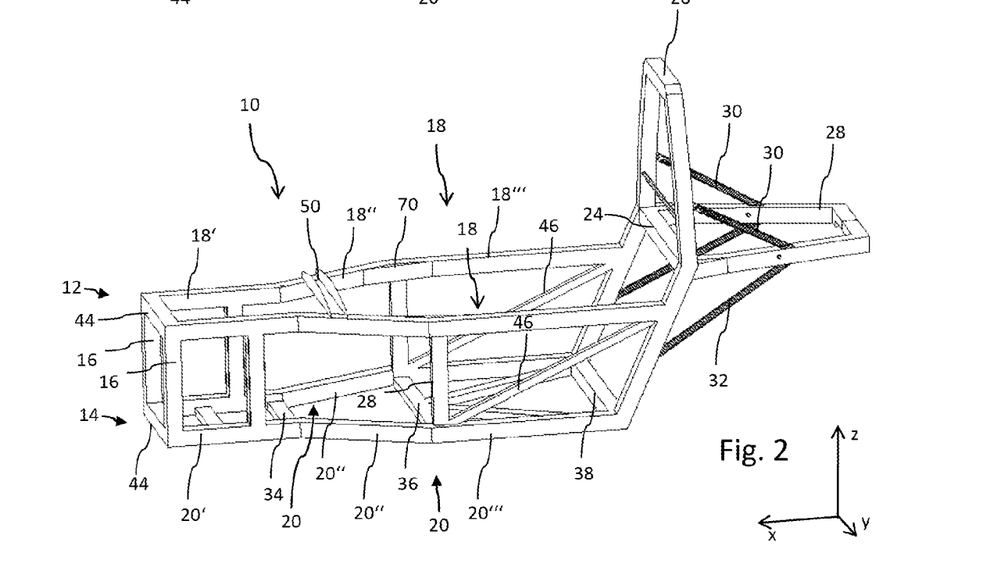
FIG. 2 is a further illustration of the tubular frame structure according to FIG. 1.
Figure 3:
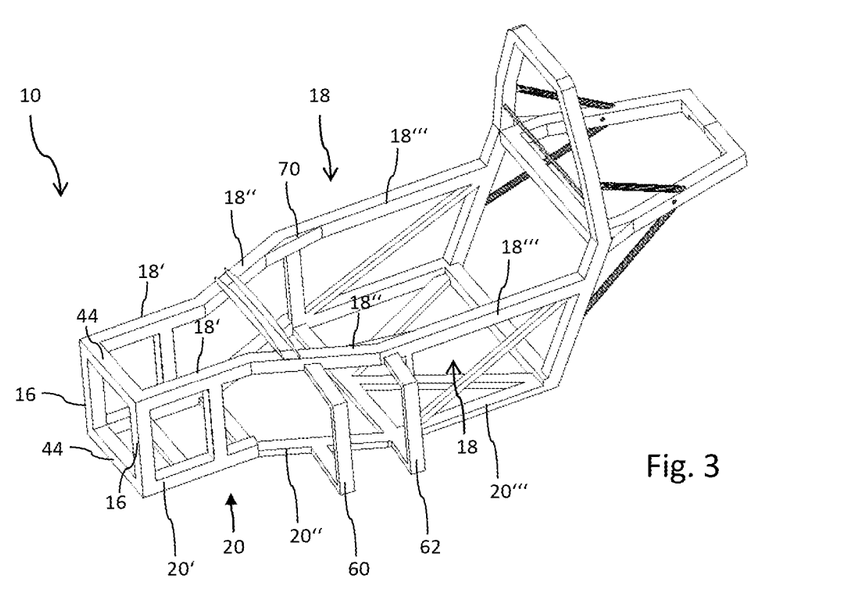
FIG. 3 is a modified tubular frame structure with a battery holding structure.

In the embodiment according to FIG. 3, the transverse tube 36 is extended, as it were, outwards, facing the observer, and opens into a battery holding structure 62 constructed in the manner of a C-section or U-section, which runs protruding outwards between upper frame 12 and lower frame 14. In the vehicle longitudinal direction (x) offset parallel to the battery holding structure 62 a further holder 60 is provided, which comes to lie approximately at the height of the traverse member 50 and is arranged accordingly positioned in front of the holding structure 62 in the direction of travel. The two holding structures 60, 62 form a receiving region for a battery 64, indicated in FIG. 4, which can be fastened externally or respectively outside the longitudinal tubes 18, 20 on the tubular frame structure 10. The battery 64 and its battery holding structure 62, 60 come to lie here, in relation to the direction of travel, behind the front wheels 52, 54.

Figure 4:
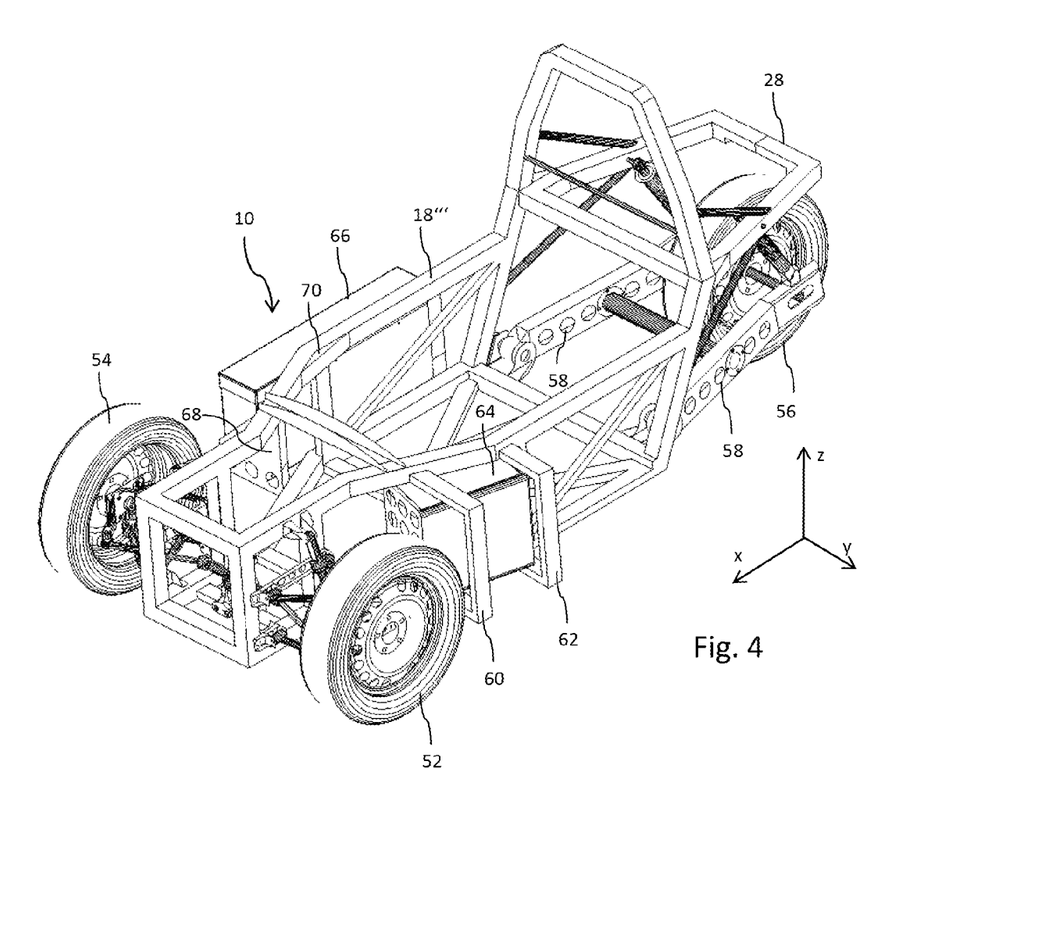
FIG. 4 is a vehicle body provided with a tubular frame structure according to FIG. 3.

In FIG. 4 in addition a further battery 66 is shown, arranged on the right side of the vehicle, which battery is fastened to the upper frame 12 by means of a battery carrier 68. The upper frame 12, which is constructed as a main frame and is arranged approximately at the height of a bumper structure, serves in this respect directly as a supporting structure and suspension device for the batteries 64, 66.

Figure 5:
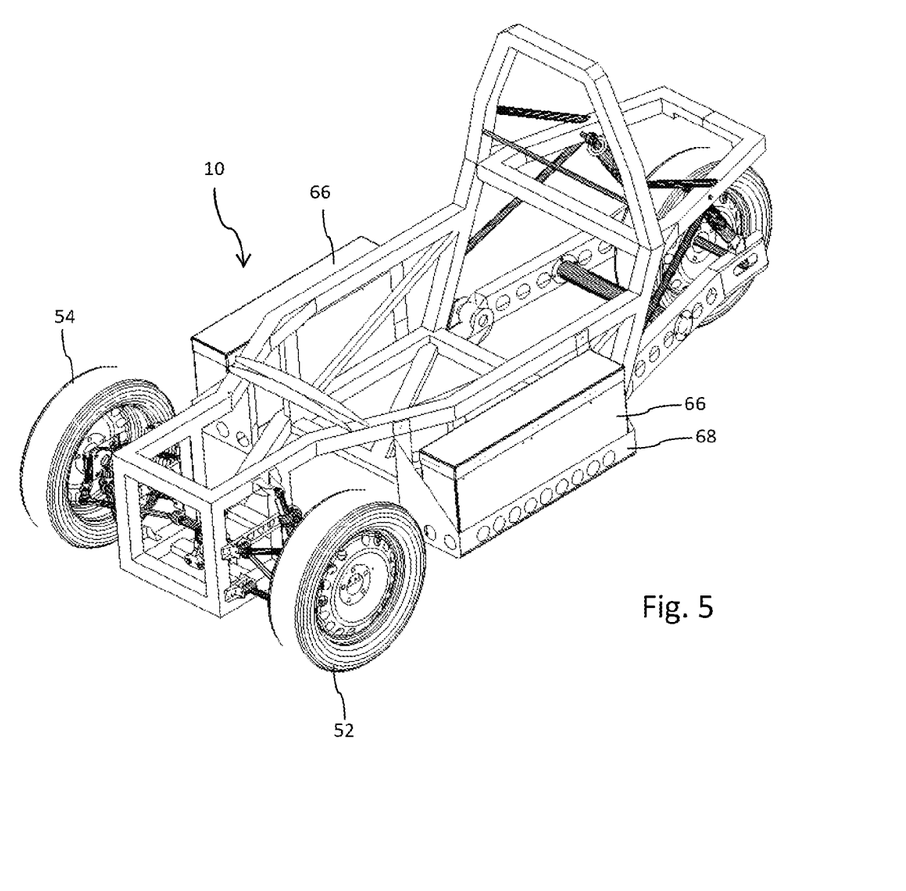
FIG. 5 is a vehicle body, based on the tubular frame structure according to FIG. 1.
Figure 6:
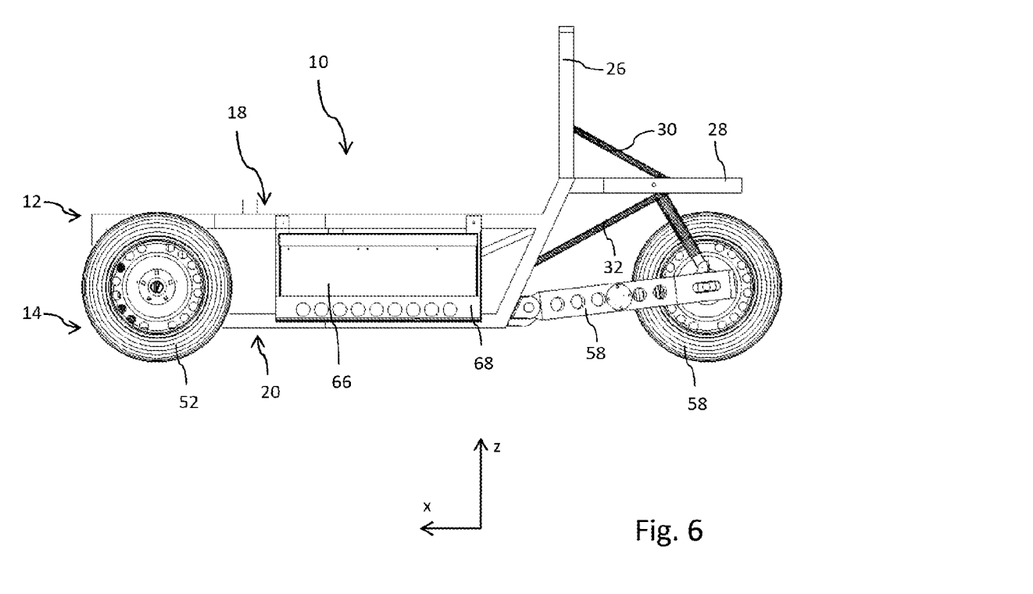
FIG. 6 is a side view of the vehicle body, according to FIG. 5.

In FIG. 4 to FIG. 6 in addition two rear wheel rockers 58 are shown, which extend toward the rear from the rear end section of the lower frame 14 and support between them a rear wheel 56 resting in an elastic manner on the bracket 28. The wheel suspension for the front wheels 52, 54, on the other hand, is connected in the front cage structure formed by upper frame 12, lower frame 14 and by corresponding transverse tubes 44, 34 and connecting tubes 16.

Although the embodiments which are shown show predominantly square tubes, the invention is in no way restricted to such geometries. Round section tubes and tubular or supporting structure components composed of several parts or shells can also be used likewise in the tubular frame structure. The tubular frame structure that is shown here is also not to be designed exclusively for three-wheeled vehicles. It can basically also be used optionally for four-wheeled vehicles and be adapted accordingly. The motor vehicle can also be implemented both purely electrically, as a hybrid vehicle or purely with an internal combustion engine as drive.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A tubular frame structure for a motor vehicle having two wheels when viewed in a direction of travel corresponding to a vehicle longitudinal direction, the tubular frame structure comprising:
 an upper frame extending in the vehicle longitudinal direction and a vehicle transverse direction and having a first front end section, a first rear end section, and a first intermediate section that couples the first front end section to the first rear end section, wherein the first intermediate section projects obliquely outwards contrary to the direction of travel, the upper frame comprising:
  a first plurality of longitudinal tubes spaced apart from one another laterally and being aligned substantially parallel to one another and running substantially in the vehicle longitudinal direction, the first plurality of longitudinal tubes comprising a first front longitudinal tube, a second front longitudinal tube, a third rear longitudinal tube and a fourth rear longitudinal tube;
  a first transverse tube that structurally connects the first and the second front longitudinal tubes with one another at the first front end section;
  a first intermediate tube that structurally connects the first front longitudinal tube to the third rear longitudinal tube, and a second intermediate tube that structurally connects the second front longitudinal tube to the fourth rear longitudinal tube; and
  a first traverse member that extends substantially in the vehicle transverse direction and that structurally connects first and second intermediate tubes with one another in a region of the intermediate section;
 a lower frame extending in the vehicle longitudinal direction and the vehicle transverse direction and having a second front end section, a second rear end section and a second intermediate section that couples the second front end section to the second rear end section, wherein the second intermediate section projects obliquely outwards contrary to the direction of travel, the lower frame comprising:
  a second plurality of longitudinal tubes, spaced apart from one another laterally and being aligned substantially parallel to one another and running substantially in the vehicle longitudinal direction; and
  a plurality of second transverse tubes that structurally connect the second plurality of longitudinal tubes with one another at the second front end section and at the second rear end section; and
 a plurality of connecting tubes extending substantially in a vehicle vertical direction that are configured to structurally connect the upper frame and the lower frame to form an energy absorption structure; and
 a roll bar structurally coupling the third rear longitudinal tube and the fourth rear longitudinal tube, the roll bar being arranged extending in a plane formed by the vehicle vertical direction and the vehicle transverse direction.

2. The tubular frame structure according to claim 1, wherein the upper frame is aligned substantially parallel to the lower frame and spaced apart in the vehicle vertical direction.

3. The tubular frame structure according to claim 1, wherein the upper frame and the lower frame are structurally connected in the region of the first and second rear end sections via a strut extending in the vehicle vertical direction and the vehicle longitudinal direction.

4. The tubular frame structure according to claim 1, further comprising:
 at least one outwardly projecting battery holding structure coupled between the upper frame and the lower frame.

5. The tubular frame structure according to claim 1, further comprising:
 an outwardly projecting battery holding structure,
 wherein the second plurality of longitudinal tubes comprise a first rear longitudinal tube and a second rear longitudinal tube that are structurally connected to one another via the outwardly projecting battery holding structure.

6. The tubular frame structure according to claim 5, wherein the outwardly projecting
 battery holding structure that lies behind a front axle of the motor vehicle.

7. The tubular frame structure according to claim 1, wherein the upper frame is constructed as a main frame and, viewed in the vehicle vertical direction, comes to lie at a height of a bumper structure.

\* \* \* \* \*